United States Patent

[11] 3,596,889

| | | |
|---|---|---|
| [72] | Inventor | George F. Hanks<br>Avon, Conn. |
| [21] | Appl. No. | 839,156 |
| [22] | Filed | July 7, 1969 |
| [45] | Patented | Aug. 3, 1971 |
| [73] | Assignee | Emhart Corporation<br>Bloomfield, Conn. |

[54] GLASS MELTING FURNACE
3 Claims, 3 Drawing Figs.

[52] U.S. Cl. ............................................. 263/11,
263/40
[51] Int. Cl. ....................................... F27b 14/00
[50] Field of Search ............................. 263/11, 40,
43

[56] References Cited
UNITED STATES PATENTS
862,684   8/1907   Vivian .......................... 263/40

2,511,676   6/1950   Morton ....................... 263/43
2,523,644   9/1950   Bloom ......................... 263/43

Primary Examiner—John J. Camby
Attorney—McCormick, Paulding and Huber

ABSTRACT: A rectangular furnace has openings at one end through which the batch material to be melted is introduced, and throat openings at the opposite end through which the molten glass can flow to forehearth and feeder installations. The lengths of the sides of the rectangular furnace are related to these opposed ends in the range of ratios between 3:1 and 4.5:1. The sole source of heat is provided by burners in the withdrawal end, so arranged as to fire upstream toward the batch charging end, a stack being located at the latter end to allow the products of combustion to escape from the furnace. The furnace roof provides a space for these combustion gasses above the melted and melting glass which has a constant vertical cross-sectional size throughout its length.

Patented Aug. 3, 1971
3,596,889
2 Sheets-Sheet 1
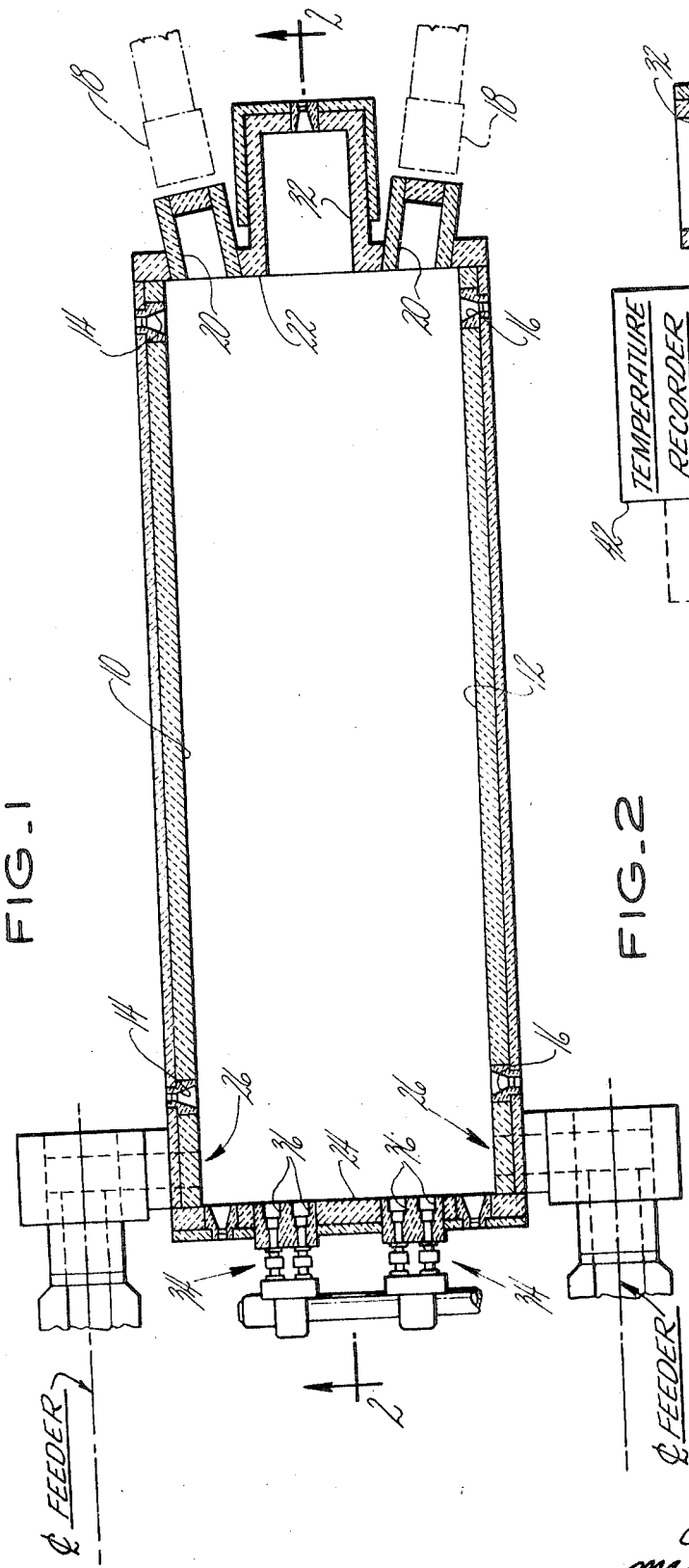
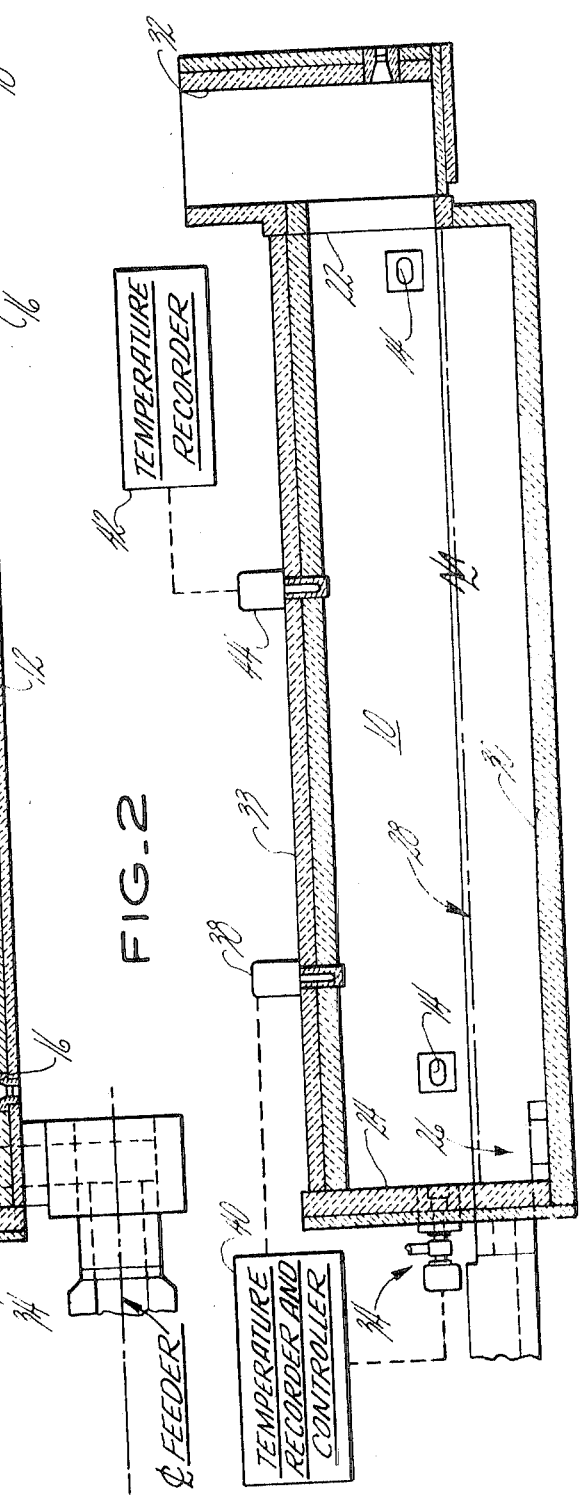
INVENTOR
GEORGE F. HANKS
BY McCormick, Paulding & Huber
ATTORNEYS

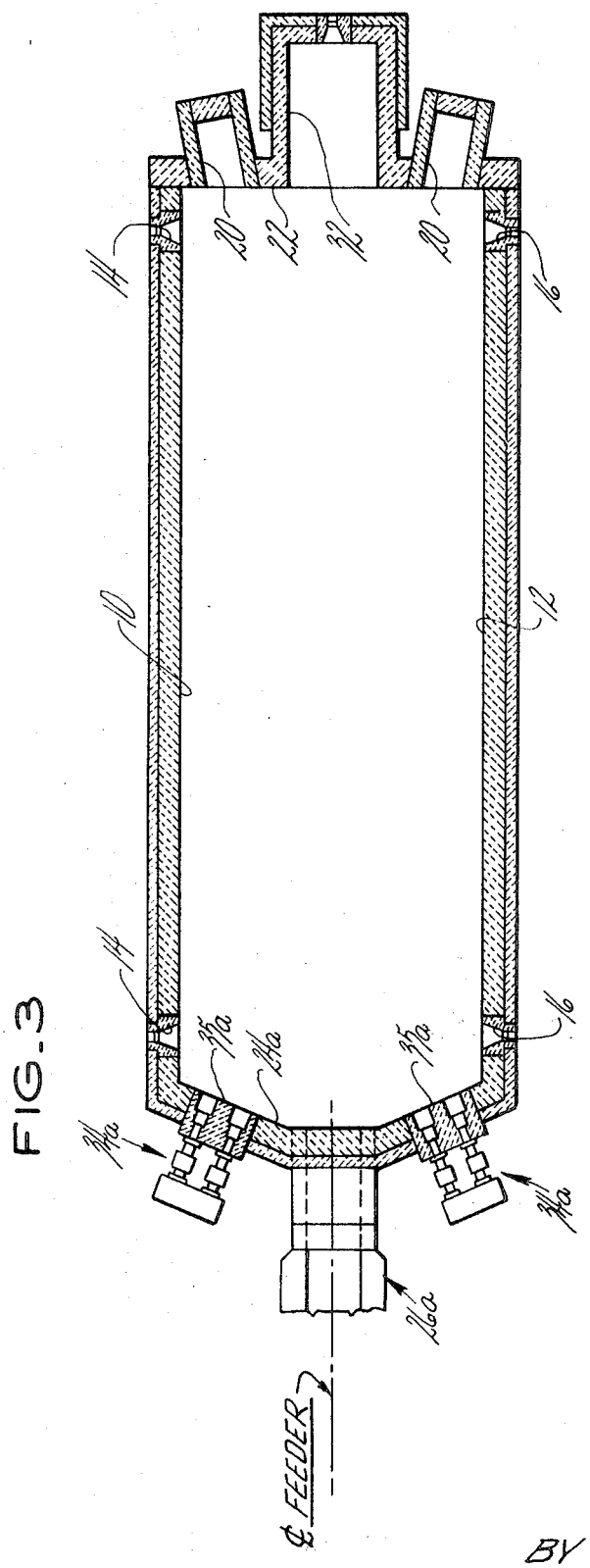

GLASS MELTING FURNACE

BACKGROUND OF INVENTION

This invention relates to glass melting furnaces, and deals more particularly with a direct-fired furnace for the continuous melting of glass batch materials for supplying molten glass to glassware forming machines.

Direct fired glass melting furnaces of the type described in U.S. Pat. No. 2,890,547 issued to A.K. Lyle in 1959 have been in use heretofore, but such furnaces have characteristically been provided with burners which fire laterally across the channel through which the molten glass flows. This burner configuration has required the use of a relatively large number of burners, which are necessarily of relatively small capacity due to the rectangular furnace configuration and therefore contribute to a relatively high initial cost. As a result of the use of many burners in the furnace sidewalls, the heat loss in this portion of the furnace has been excessive, contributing to the cost of operating this type of furnace.

Still another disadvantage arising from this type of direct fired furnace can also be attributed to the sidewall located burners. At least two distinct zones of the furnace require independent temperature regulation through control of groups of these burners to maintain the desired longitudinal temperature distribution in the furnace. Generally, the end of the furnace at which the batch materials are introduced is the cooler end, and the stack is located in this area to maximize the heating effect of the combustion products before they are discharged. Therefore, the hottest region of the furnace is generally nearer the downstream or glass discharge end than the upstream or charging end. It has been found that in a furnace with many sidewall mounted burners, that the human operator is apt to upset the desirable temperature distribution alluded to above, especially during initial starting up of the furnace. Also, in this connection, it has been common practice in recent years to incline the furnace roof in this type of furnace so that those burners adjacent the discharge end of the furnace do not saturate the atmosphere at this end of the furnace with combustion gasses because of their relative remoteness from the stack. See for example the furnace configuration shown in U.S. Pat. No. 3,362,808 issued to A.K. Lyle in 1969 wherein a side-fired glass melting furnace is shown with such an inclined roof structure.

Accordingly, the primary object of the present invention is to provide a glass melting furnace which overcomes the disadvantages associated with a side-fired rectangular furnace of the type described hereinabove.

SUMMARY OF INVENTION

In accordance with the present invention, a rectangular furnace is provided with burners located in the discharge end for firing upstream toward the charging end. The need for small side firing burners with their manifold problems is thereby eliminated and the following objects attained.

First, the use of a few large burners reduces the initial installation cost to a glass forming shop, and as a result of the sidewalls being free of the numerous parts formerly required for the many small burners this portion of the furnace can be better insulated and the operating costs substantially reduced.

Second, temperature control problems are vastly simplified, only one sensing device being required to maintain the desired longitudinal temperature distribution therein.

A third object of the present invention is to provide an end-fired glass melting furnace of the foregoing character wherein the need for an inclined roof is eliminated, the space between the molten glass and the roof being of constant vertical cross-sectional size and therefore less expensive to manufacture than the more conventional inclined roofs found on present day furnaces.

Still another object of the present invention is to provide an end-fired furnace for melting glass wherein the glass flows through the furnace in one direction and the products of combustion are exhausted in the opposite direction so that they pass over the cold batch last, and reach the stack at the lowest possible temperature, thereby optimizing the thermal efficiency of the furnace and reducing the operating cost thereof.

In carrying out the above-stated objects of the present invention, a rectangular furnace is provided with insulated sidewalls free from burner openings heretofore required with the side-fired furnace construction. The burners are located adjacent the glass discharge end of the furnace, and fire upstream in a direction opposite the flow of molten glass to be exhausted only after transferring a maximum amount of heat to the glass.

BRIEF DESCRIPTION OF DRAWINGS

FIG. 1 is a horizontal section view of a glass melting furnace embodying the present invention, conventional glass batch charging devices being shown in broken lines in this view.

FIG. 2 is a longitudinal vertical sectional view of the furnace of FIG. 1, this view being taken on the line 2-2 of FIG. 1, and also showing in schematic fashion the temperature recording and controlling apparatus for the burners used in the furnace of FIG. 1.

FIG. 3 is a horizontal sectional view of an alternative form for a glass melting furnace constructed in accordance with the present invention.

DETAILED DESCRIPTION

Turning now to the drawings in greater detail, FIG. 1 shows a preferred form of glass melting furnace constructed in accordance with the present invention as comprising a generally rectangular structure having a length to width ratio of approximately 3:1. The longer sidewalls, sometimes referred to as the breast walls 10 and 12, are fully insulated throughout their length and height except for the peep holes 14 and 16 provided respectively in each sidewall 10 and 12 to permit the operator of the furnace to observe the condition of the molten glass therein, and also the condition of the flame produced by the burner means to be described.

Conventional batch charges chargers 18, 18 are provided adjacent one end of the rectangular furnace and these chargers may be generally similar to those described in U.S. Pat. No. 2,533,826 granted Dec. 12, 1950 and assigned to the assignee herein. These batch chargers feed the materials to be melted into the upstream end of the furnace by depositing these materials continuously in the bays, or dog houses as they are sometimes called, indicated generally at 20, 20 in FIG. 1. While one such charger may be used in a furnace constructed in accordance with the present invention, two such chargers are preferably arranged in slightly inclined relationship to the longitudinal axis of the furnace for feeding the batch materials into the molten glass and impelling these materials toward the downstream end 24 where the molten glass is adapted to be continuously withdrawn through throat passageways indicated generally at 26, 26.

FIG. 2 shows in vertical section the furnace of FIG. 1, and more particularly illustrates one of the above-described solid sidewalls 10 with reference to the surface of the molten glass 28 in the tank. The tank or channel portion of the furnace is formed in part by the sidewall 10 and in part by a lower wall 30. A roof structure 33 of the furnace is preferably arranged parallel to the lower wall 30, but may be crown shaped when viewed in lateral section (not shown) as is conventional practice in furnaces of this type. For purposes of the present invention, it should be noted that the roof structure 33 cooperates with the surface of the glass 28 to define a space which is of constant vertical cross-sectional size throughout the length of the furnace. As so constructed the roof structure contributes to a more economical furnace since the insulating brick blocks from which the furnace is made need not be of the complex configuration commonly encountered with furnaces of the type disclosed in U.S. Pat. No. 3,362,808.

In accordance with the present invention burner means is provided adjacent the downstream, or discharge end 24 of the furnace, for firing upstream toward the end 22 for achieving flow of the products of combustion from said burner means in a direction opposite to that of the flow of glass through the furnace. A stack indicated generally at 32 is provided adjacent the upstream end of the furnace for withdrawal of the products of combustion, but only after a very efficient removal of heat therefrom as the products of combustion are required to travel the entire length of the furnace before being so removed. As best shown in FIG. 1 the burner means comprises a pair of relatively large subassemblies 34, 34 each of which subassemblies includes two nozzles 36, 36 so arranged as to fire in the upstream direction and generally toward the stack 32. Thus only two nozzle blocks 35, 35 are required in place of the manifold nozzle blocks heretofore required in a side-fired furnace of the type described above. It is characteristic of such nozzle blocks generally that they are poor insulators as compared with the conventional blocks used in fabricating the solid walls 10 and 12, and thus it will be apparent that the end-fired furnace described herein does provide a more efficient furnace than the conventional side-fired furnace.

While the preferred ratio of the lengths of the sides 10 and 12 of the furnace with respect to the end walls 22 and 24 lies in the range of 3:1 it has been found that as long as this ratio does not exceed approximately 4.5:1, than an end-fired furnace of the type described herein does achieve the objects set forth hereinabove. Conversely, in a furnace wherein the lengths of the sidewalls becomes less than three times that of the end walls it has been found that the firing become inefficient because of the relative short distance the flame travels before being exhausted thru the stack.

In further accordance with the present invention, a single temperature sensing element 38 is located in the furnace roof 33 somewhat closer to the burner means than to the stack 32 so as to sense the ambient temperature adjacent the hottest region of the furnace, and means 40 is provided for controlling the burners in response to a predetermined temperature range sensed by the element 38. The said means 40 for controlling the burners also includes temperature recording apparatus, and, in addition, temperature recording means 42 may be provided for indicating to the operator the history of temperature variations in the upstream region of the furnace between the sensing element 38 and the stack 32. It is an important feature of the present invention that only a single sensing element 38 need by provided, and preferably is located adjacent the hottest region of the furnace to control the burner means 34, 34. As brought out hereinabove, with prior art furnaces generally, that is with burner means being provided in the sidewalls thereof, more than one such sensing element is required for properly controlling the longitudinal temperature distribution in the rectangular furnace. On the other hand, in a furnace with a length to width ratio in a range between 3:1 and 4.5:1, and with burner means for firing into the end of the furnace opposite the end associated with the batch chargers, it has been found that a single temperature sensing element such as shown at 38 can be used for controlling all of the burners used in the furnace.

FIG. 3 shows a generally rectangular furnace constructed in accordance with the present invention but of sightly different configuration than that shown in FIGS. 1 and 2. The furnace of FIG. 3 is suitable for use with a single throat passageway 26a. The burner means 34a, 34a are adapted to fire in an upstream direction and may be inclined slightly with respect to the longitudinal axis of the furnace if desired. The longitudinally extending sidewalls 10 and 12 of the furnace shown in FIG. 3 are generally similar to those described hereinabove with reference to FIGS. 1 and 2 and need not be described in detail herein. The same is true of the dog houses 20, 20 through which the batch materials are introduced to the furnace, and also is true of the stack 32. The downstream end of the furnace indicated generally at 24a in FIG. 3 may comprise an end wall of planar configuration as shown in FIG. 1 or may comprise three mutually canted segments as shown in FIG. 3, one of which is associated with the throat passageway 26a, and the other two of which segments are inclined slightly with respect to the lateral direction and are fitted with burner blocks 35a, 35a associated with the burner means 34a, 34a.

I claim:

1. In a glass melting furnace of generally rectangular configuration wherein the glass batch materials are introduced adjacent one end and the molten glass is to be withdrawn adjacent the opposite end, the improvement comprising burner means at said opposite end for firing upstream toward said one end, a stack adjacent said one end for achieving flow of the products of combustion from said burner means in a direction opposite that of the flow of glass through the furnace, a roof which defines a space above the glass into which the burner means fire longitudinally as aforesaid, said space being of constant vertical cross-sectional size throughout the length of the furnace.

2. A glass melting furnace as set forth in claim 1, wherein said one and said opposite end of said rectangularly shaped furnace are each no longer than 1/3 the length of said furnace and no shorter than 1/4.5 the length thereof.

3. A glass melting furnace as set forth in claim 1 and further characterized by temperature sensing means located in the furnace roof and closer to the burner means than to the stack so as to sense the ambient temperature adjacent the hottest region of the furnace, and means for controlling the burner means in response to a predetermined temperature range of said temperature sensing means.